Aug. 26, 1969  S. FRIEDBERG  3,463,577
SUN REFLECTING BOARD
Filed April 3, 1967  3 Sheets-Sheet 2
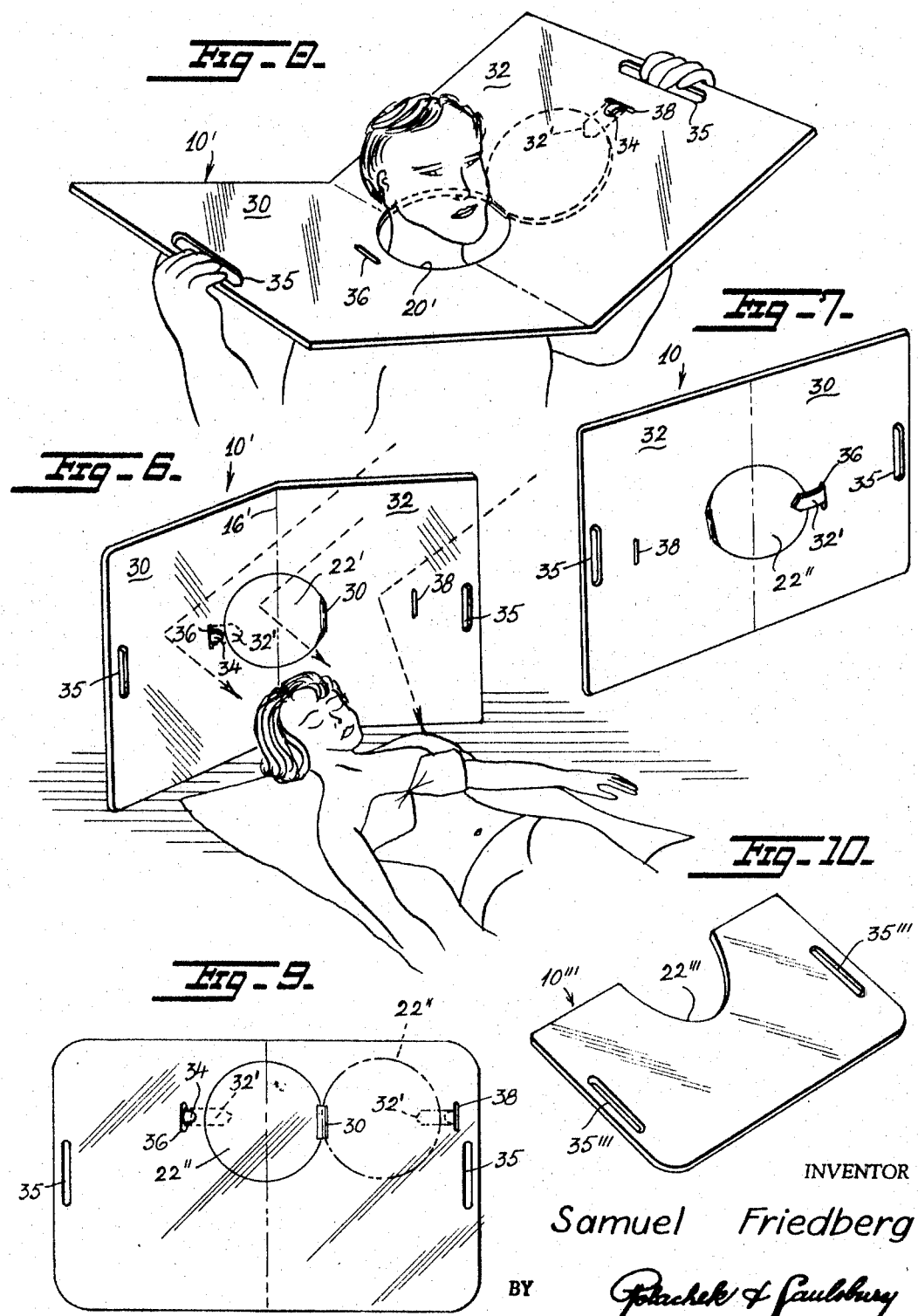
INVENTOR
Samuel Friedberg
BY
*Potachek & Saulsbury*
ATTORNEYS Aug. 26, 1969   S. FRIEDBERG   3,463,577
SUN REFLECTING BOARD
Filed April 3, 1967   3 Sheets-Sheet 3
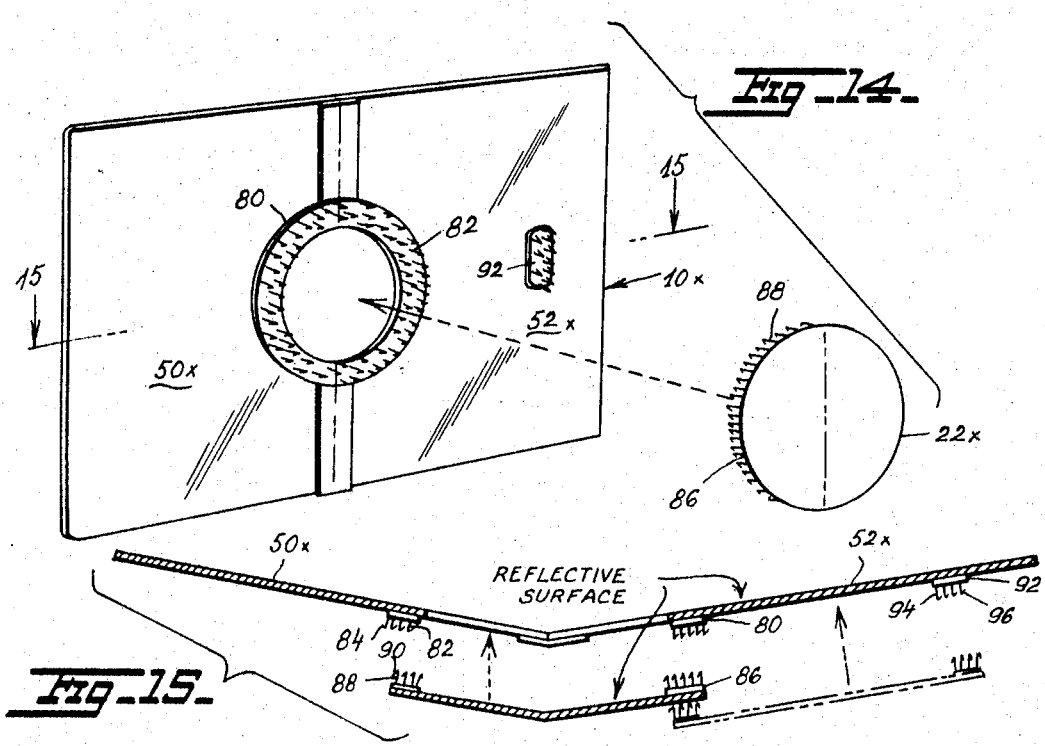
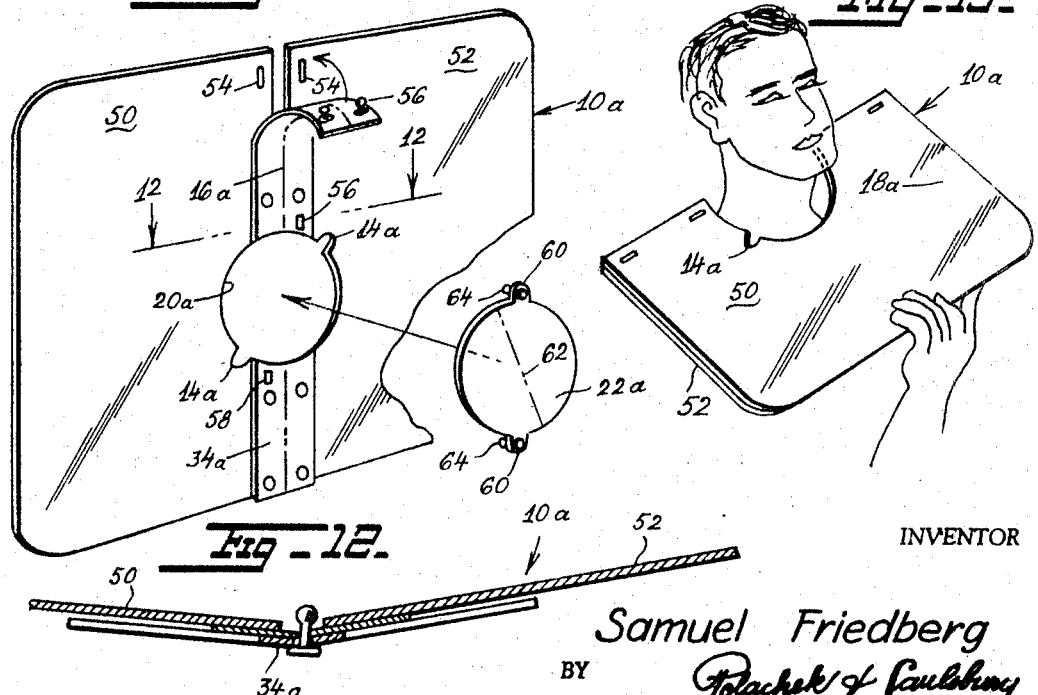
INVENTOR
Samuel Friedberg
BY
*Polachek & Saulsbury*
ATTORNEYS United States Patent Office 3,463,577
Patented Aug. 26, 1969

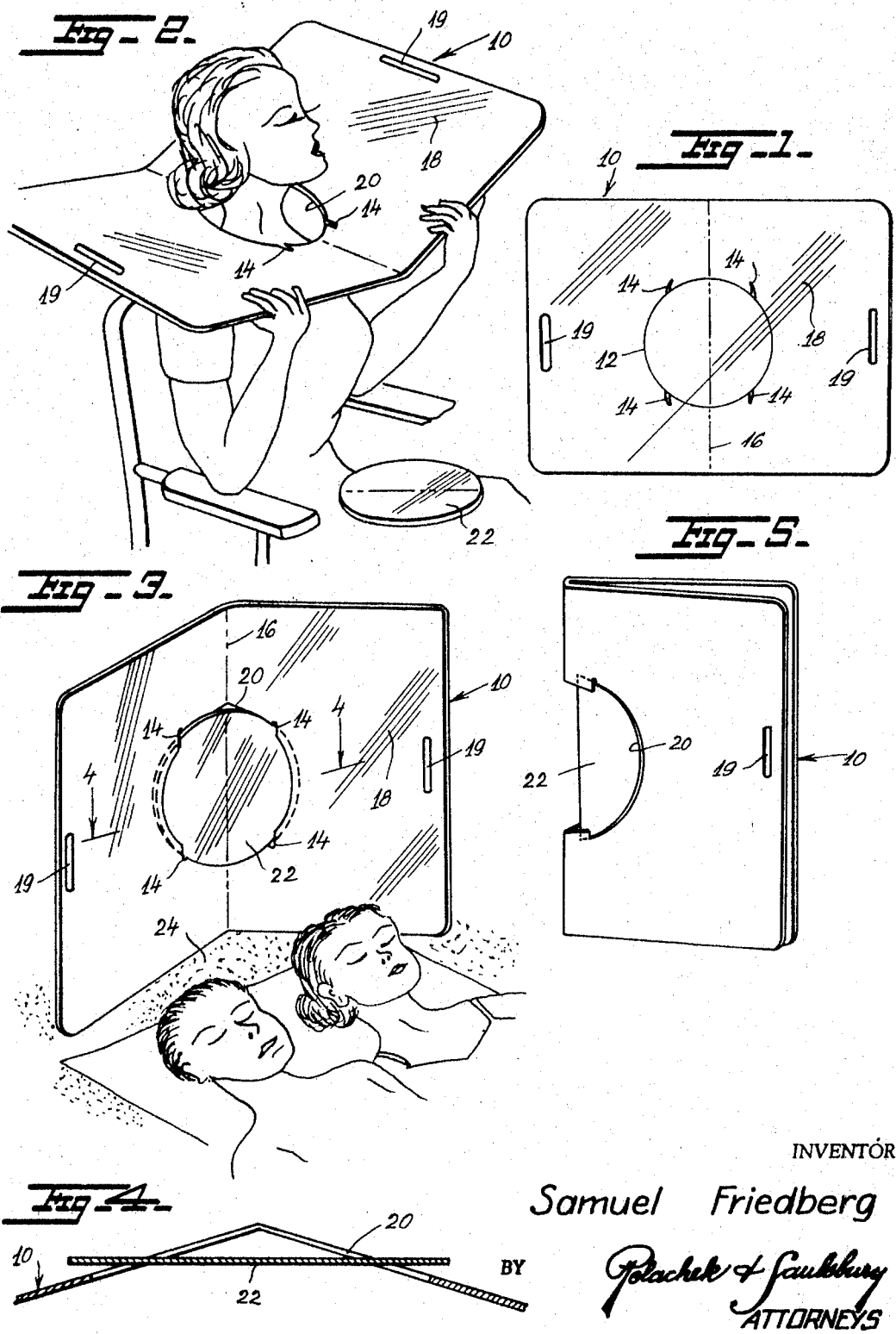

3,463,577
SUN REFLECTING BOARD
Samuel Friedberg, Chelsea Towers, Apt. 708, Ventnor
Ave., Atlantic City, N.J. 08403
Filed Apr. 3, 1967, Ser. No. 627,898
Int. Cl. G02b 5/08
U.S. Cl. 350—292                             1 Claim

ABSTRACT OF THE DISCLOSURE

A sun-reflecting board having a rectangular shaped foldable body with a reflecting surface on one side thereof. The body is formed with a central circular portion adapted to be removed to provide an opening for placing the board over the head for support on the shoulders of the user. The body is formed with means for holding the circular portion in opening-closing position after removal and restoration.

---

An important object of the invention is to provide a sun-reflecting board wherein the inner surface is of a reflecting nature such as silver or aluminum paint, or a material having reflecting qualities, while the body of the board is made of cardboard so that it may be folded along a preformed crease.

Another object of the invention is to provide a sun-reflecting board that is adapted to be placed over the head and supported on the shoulders of the user when sitting up, or may be placed on a supporting surface in upright position behind the head of a person reclining on such supporting surface.

Brief description of the views of the drawings

FIGURE 1 is a top plan view of a sun-reflecting board embodying one form of the invention.

FIG. 2 is a perspective view showing the sun-reflecting board of FIG. 1 in use on a person in a sitting position.

FIG. 3 is a front perspective view of the sun-reflecting board of FIG. 1 in use behind a couple of persons in a reclining position.

FIG. 4 is a cross-sectional view taken on the plane of the line 4—4 FIG. 3.

FIG. 5 is a side elevational view of the sun-reflecting board in folded condition.

FIG. 6 is a view similar to FIG. 3 showing a sun-reflecting board embodying a modified form of the invention.

FIG. 7 is a rear perspective view thereof.

FIG. 8 is a perspective view of the board of FIG. 6 in use on a person in a standing position.

FIG. 9 is a top plan view of a sun-reflecting board embodying yet another modified form of the invention.

FIG. 10 is a top plan view of a sun-reflecting board embodying still another modified form of the invention.

FIG. 11 is a view similar to FIG. 7 of yet another modified form of sun-reflecting board, parts being shown broken away, parts being shown disassembled.

FIG. 12 is an enlarged sectional view taken on the plane of the line 12—12 of FIG. 11.

FIG. 13 is a perspective view of the board of FIG. 11 in folded condition in use.

FIG. 14 is a view similar to FIG. 7 of yet another modified form of sun-reflecting board, parts being shown disassembled.

FIG. 15 is a cross-sectional view on an enlarged scale taken on the plane of the line 15—15 of FIG. 14.

Detailed description of the drawings

Referring now in detail to the various views of the drawings, in FIG. 1 there is shown a sun-reflecting board 10 which is preferably cut or stamped from relatively thick cardboard and when laid out flat is rectangular in shape. The board may be made of plastic, aluminum or any other suitable material. The body of the board is formed with a circular cut or slit 12, at the center thereof, the cut extending through the material of the body. The slit defines a disc-shaped portion 22. The cut is notched on both sides of the transverse axis thereof, the notches 14 extending transversely toward the long edges thereof. A crease line 16 is formed in the material of the body of the board 10 across the center thereof from side to side including the body of the disc-shaped portion 22.

One surface of the cardboard body is covered with reflecting material as indicated at 18. The reflecting material is preferably aluminum paper, tin foil and the like, but may be a silver paint or an aluminum paint. The reflecting material reinforces the material of the body of the board. Hand holes 19 are preferably formed in the body adjacent the end edges thereof for manipulating the board.

In use, in order to place the sun-reflecting board 10 over the head of the wearer as shown in FIG. 2, the material of the body of the board 10 inside the circular cut 12 is manually pushed out leaving the opening 20 and forming a disc 22 of the same dimensions as the opening 20. The body of the board is then slipped over the head resting on the shoulders of the wearer. Then by folding the body of the cover slightly upwardly on both sides of the crease line 16, not only will the wearer get the direct rays from the sun but the rays that otherwise would not strike the face will strike the board and be reflected on the front and side face of the wearer as will be understood. The sun's rays will also be reflected onto the front of the face, the front and sides of the neck and the back of the head and neck of the wearer.

When the board 10 is to be used by a person or persons reclining on a surface such as a beach 24 shown in FIG. 3, the disc 22 is restored to the body to close the opening 20, and this is done by folding the body slightly along the crease line 16 and pulling outwardly on the arcuate edge of the material of the body between the upper pair of notches and between the lower pair of notches, the material therebetween flexing spreading the walls of the notches to permit the periphery of the disc 22 to be inserted inwardly of said flexed portions of the body, such flexed portions exerting a clamping action on the covered sections of the periphery of the disc for holding such disc in closing position, as seen in FIGS. 3, 4 and 5.

With particular reference to FIGS. 6 to 8, inclusive, herein there is shown a sun-reflecting board 10' embodying a modified form of the invention. Board 10' differs from board 10 of FIG. 1 in that the disc 22' is formed integrally with the body at one side of the crease line 16' by a hinge 30 so that the disc is tied to the body and cannot be removed therefrom.

A short rectangular length of tape 32' is secured at one end to the periphery of the disc at the rear thereof at a point opposite the hinge 30, the strip extending over the rear surface of the body of the board and carrying a hook 34 on its free end adapted to extend through and interlock with the edges of the slot 36 formed in the material of the body threat, to hold the disc in closed position. The slot and hook hold the disc in closed position flush with the surface of the body of the board. Hand holes 35, 35 are formed in the body of the board adjacent its ends to facilitate manipulation of the board.

In using the sun-reflecting board 10', when sitting or standing, the material of the body forming the disc 22' is pushed outwardly forming an opening 20', the disc being swung over the rear surface of the body on the other side of the crease line 16' and the hook 34 hooked over the edges of slot 38 formed in the body. The opening 20' is then placed over the head, the body resting on the shoulders of the user as seen in FIG. 8. The body of the board on both sides of the crease line 16' is then bent upwardly and held in bent condition by the hands of the wearer as shown in FIG. 8.

When reclining on the beach 24 as shown in FIG. 3, the body of the board 10' is placed in upright position with the pieces 30 and 32 slightly folded along the crease line 16', the crease line being placed directly behind the head of the user. When the board is thus positioned, the rays of the sun in addition to striking the face directly also bounces off the reflected surface of the board onto the exposed body, face, neck and head of the user.

In FIG. 9, another modified form of board 10'' is shown which differs from the board 10' of FIG. 6 merely in that the disc 22'' is located adjacent one long edge of the body instead of being in the center thereof. This form of board may be worn when in a sitting position or when reclining on the beach.

Another modified form of board 10''' is shown in FIG. 10. The board 10''' is somewhat similar to board 10 in that the body is rectangular in shape but the body is uncreased. Midway the ends of one long line a semi-circular recess 22''' is formed in the material. Hand holes 35''' are formed in the body near the end edges thereof.

In use, the recess 22''' is placed around the neck of the user, the body grasped at the ends thereof and bent across midway the ends, the flexible material of the body permitting this operation.

In FIGS. 11 and 12 and 13, still another modified form of sun-reflecting board 10a is shown. The body of the board is sectional including sections 50 and 52 disposed edge to edge and secured together removably by a tape 34a. The adjacent edges of the sections are formed with a series of spaced short closed slots 54 therealong. The tape 34a carries a series of male snap fastener elements 56 spaced along both long edges thereof coacting with the slots for holding the tape in operative position. At its center, the body is formed with a central circular opening 20a intersecting both adjacent long sides of the sections and encompassing the tape 34a. Opposed notches 14a are formed in the body portions intersecting the opening. The notches are disposed at an oblique angle to the vertical providing a notch on each side of the tape 34a. A preformed crease line 16a is formed longitudinally of the tape centrally thereof. A closed slot 56 is formed in the tape 34a to one side of the crease line above the opening 20a and a similar slot 58 on the other side of the tape below the opening. One surface of the cardboard body is covered with reflecting material as indicated at 18a.

A disc 22a of generally the same dimensions as the opening 20a serves as a plug to close the opening 20a. The disc is formed with a pair of opposed perforated ears 60, 60 disposed at an oblique angle to the vertical and the disc is also formed with a preformed crease line 62 adapted to align with the crease line 16a in the tape when the disc is plugged in. Pins 64 carried by the perforated ears of the disc coact with the slots 56 to hold the disc in closing position. When the disc is plugged in, the board may be used as shown in FIG. 6.

The board 10a may be folded and slipped over the head of the wearer as shown in FIG. 13 with one section, for example, section 50, under the chin of the wearer. The board 10a functions similarly to board 10.

FIGS. 14 and 15 illustrate yet another modified form of sun-reflecting board 10x which is somewhat similar to the board 10a except the means for removably fastening the disc 22x to the body of the board 10x is different. For this purpose, on the rear surfaces of the sections 50x and 52x, a circular tape body 80 is secured by adhesive or the like. This tape is a nylon tape of the kind available under the trade name "Velcro." The tape body 80 is provided with loosely woven semi-rigid, mono-filament nylon loops 82 which are formed with hooks 84 at the ends thereof. A similar circular tape 86 is fastened to one surface of the disc 22x around the periphery thereof, the tape 86, however, is provided with radiating closely woven nylon loops 88 with hooks 90. When the disc 22x is plugged in and the tapes are pressed together, the hooks 84 on loops 82 enter between the closely woven loops 88 on disc 22x and strongly grip such loops so as to releasably retain the disc and body of the board in pressed together relationship. The disc may be removed by forcibly pulling the disc and body of the board apart. A short length of tape 92 is fastened to one of the sections, for example, section 52 of the body of the board. Tape 92 has loosely woven nylon loops 94 thereon which are adapted to interlock with the loops 88 on the circular tape 86 on disc 22x for holding the disc in inoperative position.

By making the board out of strong cardboard, it may be folded and refolded many times along the preformed crease line and give relatively long service.

What is claimed is:

1. A sun reflecting board comprising a rectangular cardboard body, one surface thereof covered with a reflecting material, said body having a circular opening at the center, an independent circular disc covered with reflecting material and substantially the same size of said opening, a plurality of spaced notches formed in said body and extending into said circular opening, said notches and portions of the circumferential edges of the disc constituting a means to detachably secure said disc in the opening of the cardboard body, said cardboard body and disc having a preformed central crease line, the crease line of said body extending transversely of the body while passing through the diameter of the opening.

References Cited

UNITED STATES PATENTS 2,626,609   1/1953   Friedberg _____ 350—292

FOREIGN PATENTS 491,244   3/1953   Canada.

DAVID SCHONBERG, Primary Examiner

A. M. OSTRAGER, Assistant Examiner

U.S. Cl. X.R.

128—372; 350—298, 299